US011101964B2

United States Patent
Lyu et al.

(10) Patent No.: US 11,101,964 B2
(45) Date of Patent: Aug. 24, 2021

(54) DATA TRANSMISSION METHOD AND APPARATUS

(71) Applicant: Huawei Technologies Co., Ltd., Shenzhen (CN)

(72) Inventors: Yongxia Lyu, Ottawa-Kanata (CA); Ruixiang Ma, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 78 days.

(21) Appl. No.: 16/579,409

(22) Filed: Sep. 23, 2019

(65) Prior Publication Data
US 2020/0036499 A1 Jan. 30, 2020

Related U.S. Application Data

(63) Continuation of application No. PCT/CN2018/080388, filed on Mar. 24, 2018.

(30) Foreign Application Priority Data

Mar. 24, 2017 (CN) .......................... 201710184854.3

(51) Int. Cl.
*H04L 5/00* (2006.01)
*H04L 5/14* (2006.01)
(Continued)

(52) U.S. Cl.
CPC .......... *H04L 5/0055* (2013.01); *H04L 5/0007* (2013.01); *H04L 5/14* (2013.01); *H04W 72/0446* (2013.01); *H04W 88/02* (2013.01)

(58) Field of Classification Search
CPC ....... H04L 5/0055; H04L 5/0007; H04L 5/14; H04L 1/1861; H04L 1/1887; H04L 1/1854; H04W 72/0446; H04W 88/02
See application file for complete search history.

(56) References Cited

U.S. PATENT DOCUMENTS

2010/0039926 A1 2/2010 Zhang et al.
2016/0330782 A1 11/2016 Ang et al.
(Continued)

FOREIGN PATENT DOCUMENTS

CN 101212249 A 7/2008
CN 101651525 A 2/2010
(Continued)

OTHER PUBLICATIONS

"Fast Scheduling and Transmission for NR," Source: ZTE, Agenda item: 8.1.7.2, Document for: Discussion and Decision, 3GPP TSG RAN WG1 Meeting #86bis, R1-1608959, Lisbon, Portugal Oct. 10-14, 2016, 7 pages.
(Continued)

*Primary Examiner* — Jung H Park
(74) *Attorney, Agent, or Firm* — Slater Matsil, LLP

(57) ABSTRACT

A data transmission method, including receiving, by a terminal device in a downlink control part, first downlink control information and a first downlink reference signal that are sent by a network device, receiving, by the terminal device in a first downlink data part according to the first downlink control information, first data sent by the network device, generating, by the terminal device, feedback information based on the first downlink reference signal and the first data, sending, by the terminal device, the feedback information to the network device in an uplink feedback part, and receiving, by the terminal device in a second downlink data part according to the first downlink control information, second data sent by the network device, where the downlink control part, the first downlink data part, the uplink feedback part, and the second downlink data part constitute a first time unit.

20 Claims, 7 Drawing Sheets

(51) Int. Cl.
*H04W 72/04* (2009.01)
*H04W 88/02* (2009.01)

(56) References Cited

U.S. PATENT DOCUMENTS

2016/0338081 A1* 11/2016 Jiang .................... H04L 5/0055
2017/0026992 A1* 1/2017 Jiang ................ H04W 72/1263
2018/0035446 A1* 2/2018 Li .................... H04W 72/1236

FOREIGN PATENT DOCUMENTS

| CN | 102404801 A | 4/2012 |
| CN | 102468940 A | 5/2012 |
| CN | 106059739 A | 10/2016 |
| CN | 106301738 A | 1/2017 |
| CN | 107613568 A | 1/2018 |
| WO | 2016148878 A1 | 9/2016 |

OTHER PUBLICATIONS

"NR HARQ Timing and Feedback Schemes," Source: ZTE, ZTE Microelectronics, Agenda item: 8.1.3.3.1, Document for: Discussion & Decision, 3GPP TSG RAN WG1 Meeting #88, R1-1701593, Athens, Greece, Feb. 13-17, 2017, 8 pages.

"Indication of Early PDSCH Decoding Success for Rel-13 eMTC," Agenda Item: 6.2.1.4, Source: Lenovo, Document for: Discussion and Decision, 3GPP TSG RAN WG1 Meeting #83, R1-156726, Anaheim, Nov. 15-22, 2015, 5 pages.

"Early Hybrid ARQ Feedback for the 5G New Radio," Agenda Item: 7.1.4.4, Source: Nokia, Alcatel-Lucent Shanghai Bell, Document for: Discussion and Decision, 3GPP TSG-RAN WG1#87, R1-1612249, Reno, NV, Nov. 14-18, 2016, 7 pages.

* cited by examiner

DATA TRANSMISSION METHOD AND APPARATUS

CROSS-REFERENCE TO RELATED APPLICATIONS

This application is a continuation of International Application No. PCT/CN2018/080388, filed on Mar. 24, 2018, which claims priority to Chinese Patent Application No. 201710184854.3, filed on Mar. 24, 2017. The disclosures of the aforementioned applications are hereby incorporated by reference in their entireties.

TECHNICAL FIELD

This application relates to the mobile communications field, and in particular, to a data transmission method and apparatus in a time division duplex system.

BACKGROUND

Compared with a 4G communications system, a 5G communications system has a notable characteristic, namely, the introduction of support for ultra-reliable and low latency communications (URLLC) services. There are many types of URLLC services, and typical use cases include industrial control, industrial production process automation, man-machine interaction, telehealth, and the like. A user-plane latency of a URLLC service is required to be 0.5 ms in both an uplink and a downlink. This requirement is applicable only when neither a base station nor a terminal is in a discontinuous reception (DRX) state. It should be noted that the above performance indicator is only a typical value, and specific URLLC services may have different latency requirements. For example, for some extremely demanding industrial control, an end-to-end latency needs to be kept within 0.25 ms.

It can be learned from the foregoing that URLLC services have strict requirements on a user latency, and a solution how the latency is reduced is in need.

SUMMARY

To reduce a transmission latency in a communications system, this application describes a data transmission method and apparatus in a time division duplex system.

According to a first aspect, an embodiment of this application provides a data transmission method in a time division duplex system. The method includes receiving, by a terminal device in a downlink control part, first downlink control information and a first downlink reference signal that are sent by a network device, receiving, by the terminal device in a first downlink data part according to the first downlink control information, first data sent by the network device, generating, by the terminal device, feedback information based on the first downlink reference signal and the first data, sending, by the terminal device, the feedback information to the network device in an uplink feedback part, and receiving, by the terminal device in a second downlink data part according to the first downlink control information, second data sent by the network device, where the downlink control part, the first downlink data part, the uplink feedback part, and the second downlink data part constitute a first time unit, and in terms of timing, the first time unit sequentially includes the downlink control part, the first downlink data part, the uplink feedback part, and the second downlink data part.

In a possible implementation of the first aspect, the first data is different from the second data.

In a possible implementation of the first aspect, the first data and the second data constitute a first transport block.

In a possible implementation of the first aspect, the first time unit includes one subframe.

In a possible implementation of the first aspect, the method further includes receiving, by the terminal device, uplink feedback part configuration information from the network device, where the uplink feedback part configuration information indicates a time-frequency resource location of the uplink feedback part.

In a possible implementation of the first aspect, the first time unit includes M orthogonal frequency division multiplexing (OFDM) symbols, where M is a positive integer, and the uplink feedback part includes the $N^{th}$ OFDM symbol in the first time unit, where when N is an even number, N=M/2 or N=M/2+1, and when N is an odd number, N=(M+1)/2.

According to a second aspect, an embodiment of this application provides another data transmission method in a time division duplex system, and the method includes sending, by a network device, first downlink control information and a first downlink reference signal to a terminal device in a downlink control part, sending, by the network device, first data to the terminal device in a first downlink data part according to the first downlink control information, receiving, by the network device in an uplink feedback part, feedback information sent by the terminal device, and sending, by the network device, second data to the terminal device in a second downlink data part according to the first downlink control information, where the downlink control part, the first downlink data part, the uplink feedback part, and the second downlink data part constitute a first time unit, and in terms of timing, the first time unit sequentially includes the downlink control part, the first downlink data part, the uplink feedback part, and the second downlink data part.

In a possible implementation of the second aspect, the first data is different from the second data.

In a possible implementation of the second aspect, the first data and the second data constitute a first transport block.

In a possible implementation of the second aspect, the first time unit includes one subframe.

In a possible implementation of the second aspect, the method further includes sending, by the network device, uplink feedback part configuration information to the terminal device, where the uplink feedback part configuration information indicates a time-frequency resource location of the uplink feedback part.

In a possible implementation of the second aspect, the first time unit includes M OFDM symbols, where M is a positive integer, and the uplink feedback part includes the $N^{th}$ OFDM symbol in the first time unit, where when N is an even number, N=M/2, and when N is an odd number, N=(M+1)/2 or N=(M−1)/2.

In a possible implementation of the second aspect, the network device determines, based on the feedback information, whether to retransmit the first data and the second data in a time unit following the first time unit.

According to a third aspect, an embodiment of this application provides still another data transmission method in a time division duplex system. The method includes receiving, by a terminal device in a first downlink data part according to first downlink control information, first data sent by a network device, receiving, by the terminal device in a downlink control part, second downlink control information and a first downlink reference signal that are sent by the network device, receiving, by the terminal device in a second downlink data part according to the second downlink control information, second data sent by the network device, generating, by the terminal device, feedback information based on the first downlink reference signal and the second data, and sending, by the terminal device, the feedback information to the network device in an uplink feedback part, where the first downlink data part, the downlink control part, the second downlink data part, and the uplink feedback part constitute a first time unit, and in terms of timing, the first time unit sequentially includes the first downlink data part, the downlink control part, the second downlink data part, and the uplink feedback part.

In a possible implementation of the third aspect, the method further includes receiving, by the terminal device in a downlink control part of a time unit preceding the first time unit, the first downlink control information sent by the network device.

In a possible implementation of the third aspect, the method further includes receiving, by the terminal device in a first downlink data part of a time unit following the first time unit according to the second downlink control information, third data sent by the network device.

In a possible implementation of the third aspect, the second data is different from the third data.

In a possible implementation of the third aspect, the second data and the third data constitute a first transport block.

In a possible implementation of the third aspect, the first time unit includes one subframe.

In a possible implementation of the third aspect, the method further includes receiving, by the terminal device, downlink control part configuration information from the network device, where the downlink control part configuration information indicates a time-frequency resource location of the downlink control part.

In a possible implementation of the third aspect, the first time unit includes M OFDM symbols, where M is a positive integer, and the downlink control part includes the $N^{th}$ OFDM symbol in the first time unit, where when N is an even number, N=M/2 or N=M/2+1, and when N is an odd number, N=(M+1)/2.

According to a fourth aspect, an embodiment of this application provides yet another data transmission method in a time division duplex system, and the yet another method includes sending, by a network device, first data to a terminal device in a first downlink data part according to first downlink control information, sending, by the network device, second downlink control information and a first downlink reference signal to the terminal device in a downlink control part, sending, by the network device, second data to the terminal device in a second downlink data part according to the second downlink control information, receiving, by the network device in an uplink feedback part, feedback information sent by the terminal device, where the first downlink data part, the downlink control part, the second downlink data part, and the uplink feedback part constitute a first time unit, and in terms of timing, the first time unit sequentially includes the first downlink data part, the downlink control part, the second downlink data part, and the uplink feedback part.

In a possible implementation of the fourth aspect, the method further includes sending, by the network device, the first downlink control information to the terminal device in a downlink control part of a time unit preceding the first time unit.

In a possible implementation of the fourth aspect, the method further includes sending, by the network device, third data to the network device in a first downlink data part of a time unit following the first time unit according to the second downlink control information.

In a possible implementation of the fourth aspect, the second data is different from the third data.

In a possible implementation of the fourth aspect, the second data and the third data constitute a first transport block.

In a possible implementation of the fourth aspect, the first time unit includes one subframe.

In a possible implementation of the fourth aspect, the method further includes sending, by the network device, downlink control part configuration information to the terminal device, where the downlink control part configuration information indicates a time-frequency resource location of the downlink control part.

In a possible implementation of the fourth aspect, the first time unit includes M OFDM symbols, where M is a positive integer, and the downlink control part includes the $N^{th}$ OFDM symbol in the first time unit, where when N is an even number, N=M/2 or N=M/2+1, and when N is an odd number, N=(M+1)/2.

In a possible implementation of the fourth aspect, the network device determines, based on the feedback information, whether to retransmit the second data and the third data.

According to a fifth aspect, an embodiment of this application provides a data transmission apparatus in a time division duplex system. The apparatus may be a terminal device or a chip in a terminal device. The apparatus may include a processing unit and a transceiver unit. When the apparatus is a terminal device, the processing unit may be a processor and the transceiver unit may be a transceiver, the terminal device may further includes a storage unit, where the storage unit may be a memory, and the storage unit is configured to store an instruction, and the processing unit executes the instruction stored in the storage unit, to enable the terminal device to perform the method in the first aspect, the third aspect, any possible implementation of the first aspect, or any possible implementation of the third aspect. When the apparatus is a chip in a terminal device, the processing unit may be a processor and the transceiver unit may be an input/output interface, a pin, a circuit, or the like, the processing unit executes an instruction stored in a storage unit, to enable the terminal device to perform the method in the first aspect, the third aspect, any possible implementation of the first aspect, or any possible implementation of the third aspect, and the storage unit may be a storage unit in the chip (for example, a register or a cache), or a storage unit that is outside the chip but inside the terminal device (for example, a read-only memory or a random access memory).

According to a sixth aspect, an embodiment of this application provides a data transmission apparatus in a time division duplex system. The apparatus may be a network device or a chip in a network device. The apparatus may include a processing unit and a transceiver unit. When the apparatus is a network device, the processing unit may be a processor and the transceiver unit may be a transceiver, the network device may further includes a storage unit, where the storage unit may be a memory, and the storage unit is configured to store an instruction, and the processing unit executes the instruction stored in the storage unit, to enable the network device to perform the method in the second aspect, the fourth aspect, any possible implementation of the second aspect, or any possible implementation of the fourth aspect. When the apparatus is a chip in a network device, the processing unit may be a processor and the transceiver unit may be an input/output interface, a pin, a circuit, or the like, the processing unit executes an instruction stored in a storage unit, to enable the network device to perform the method in the second aspect, the fourth aspect, any possible implementation of the second aspect, or any possible implementation of the fourth aspect, and the storage unit may be a storage unit in the chip (for example, a register or a cache), or a storage unit that is outside the chip but inside the network device (for example, a read-only memory or a random access memory).

According to a seventh aspect, an embodiment of this application provides a data transmission apparatus in a time division duplex system, where the apparatus includes a memory and a processor. The memory stores an instruction, and when run by the processor, the instruction enables the apparatus to perform the method in the first aspect, the third aspect, any possible implementation of the first aspect, or any possible implementation of the third aspect. The apparatus may be a chip system.

According to an eighth aspect, an embodiment of this application provides a data transmission apparatus in a time division duplex system, where the apparatus includes a memory and a processor. The memory stores an instruction, and when run by the processor, the instruction enables the apparatus to perform the method in the second aspect, the fourth aspect, any possible implementation of the second aspect, or any possible implementation of the fourth aspect. The apparatus may be a chip system.

According to a ninth aspect, an embodiment of this application provides a communications system, where the communications system includes the terminal device in the fifth aspect and the network device in the sixth aspect.

According to a tenth aspect, an embodiment of this application provides a computer-readable storage medium that is configured to store a computer program, and the computer program is configured to execute an instruction of the method in the first aspect, the second aspect, the third aspect, the fourth aspect, any possible implementation of the first aspect, any possible implementation of the second aspect, any possible implementation of the third aspect, or any possible implementation of the fourth aspect.

According to an eleventh aspect, an embodiment of this application provides a program product. The program product includes a computer program (that is, an executable instruction), and the computer program is stored in a readable storage medium. At least one processor of a communications device is capable of reading the computer program from the readable storage medium, and at least one processor executes the computer program to enable the communications device to perform the method in the first aspect, the second aspect, the third aspect, the fourth aspect, any possible implementation of the first aspect, any possible implementation of the second aspect, any possible implementation of the third aspect, or any possible implementation of the fourth aspect.

In the solutions provided in this application, the terminal device generates a rough feedback based on control information and a part of data that are received in a downlink, and sends the rough feedback to the network device, and the network device can choose, based on the rough feedback, whether to perform data retransmission. This ensures soonest data retransmission and thereby reduces a transmission latency.

DETAILED DESCRIPTION OF ILLUSTRATIVE EMBODIMENTS

The following describes technical solutions in the embodiments of this application with reference to accompanying drawings.

Figure 1:
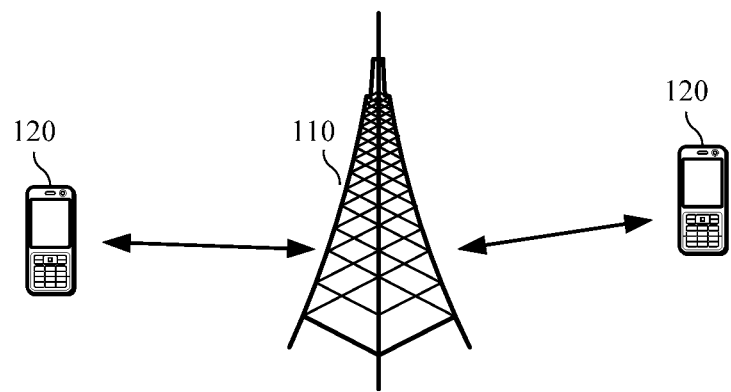
FIG. 1 is a schematic diagram of a network architecture to which embodiments of this application are applied.

FIG. 1 shows a communications system 100 to which the embodiments of this application are applied. The communications system 100 may include at least one network device 110, and a plurality of terminal devices 120 within a coverage area of the network device 110. FIG. 1 shows an example in which there is one network device and two terminal devices. Optionally, the communications system 100 may include a plurality of network devices, and within the coverage area of each network device, another quantity of terminal devices may be included. This is not limited in the embodiments of this application.

Optionally, the wireless communications system 100 may further include other network entities such as a network controller and a mobile management entity. This is not limited in the embodiments of this application.

The communications system to which the embodiments of this application are applied may be a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a 5G new radio (NR) system, or another wireless communications system that uses an orthogonal frequency division multiplexing (OFDM) technology.

The network device in the embodiments of this application may be configured to provide a wireless communication function for the terminal device. The network device may include various forms of macro base stations, micro base stations (also referred to as small cells), relay stations, access points, and the like. The network device may be a base transceiver station (BTS) in a GSM or a CDMA system, a NodeB (NB) in a WCDMA system, an evolved NodeB (eNB, or e-NodeB) in an LTE system, or a corresponding device gNB on a 5G network. For ease of description, in all the embodiments of this application, the foregoing apparatuses that provide a wireless communication function for the terminal device are generally referred to as network devices.

The terminal device in the embodiments of this application may also be referred to as user equipment (UE), a mobile station (MS), a mobile terminal, or the like. The terminal device may communicate with one or more core networks through a radio access network (RAN). For example, the terminal device may be a mobile phone (also referred to as a "cellular" phone), a computer provided with a mobile terminal or may be a portable, pocket-sized, handheld, computer built-in, or in-vehicle mobile apparatus, which exchanges voice and/or data with the radio access network. This is not limited in the embodiments of this application.

The network architecture and service scenarios described in the embodiments of this application are intended to explain the technical solutions in the embodiments of this application more clearly, and do not constitute any limitation on the technical solutions provided in the embodiments of this application. A person of ordinary skill in the art is aware that, with evolution of the network architecture and emergence of new service scenarios, the technical solutions provided in the embodiments of this application are also applicable to similar technical problems.

There are a plurality of methods to reduce latencies. One method is to reduce a time interval between user scheduling and transmission. For example, a time unit for scheduling is reduced from 1 ms to 0.125 ms. This can be implemented by introducing mini-slots, each including several OFDM symbols, with a quantity of the OFDM symbols less than a quantity of OFDM symbols included in one slot. Alternatively, a large subcarrier spacing is used. For example, a subcarrier spacing of 60 kHz is used with a fixed quantity of OFDM symbols in each slot.

Another method is to provide a feedback on data transmission or reception of the terminal device as soon as possible to ensure soonest retransmission or new transmission of data. For example, a new subframe type "self-contained subframe" is introduced to support back-to-back transmission of data. As shown in FIG. 1, the feedback on downlink data of a current subframe may be performed at the end of the subframe. The network device determines, based on a feedback result of a positive acknowledgement (ACK) or a negative acknowledgement (NACK), whether to perform retransmission or new transmission in a next frame.

However, the foregoing back-to-back transmission based on self-contained subframes requires extremely high processing capabilities of the network device and the terminal device. For example, upon reception of downlink data, the terminal device needs to start data demodulation and decoding and generate a feedback signal, so as to feed back an ACK/NACK at the end of a subframe. Accordingly, the network device needs to perform processing as soon as it receives the ACK/NACK, and to determine, at the beginning of a next frame, whether to retransmit data that is last scheduled.

In view of this, a transmission method based on a rough feedback can be used. To be specific, the terminal device provides the feedback to a base station based on an intermediate data reception result rather than a final data demodulation and decoding result. The foregoing intermediate data reception result may take various forms, for example, reception of a control channel by user equipment, channel estimation, a post-processing equivalent signal to interference plus noise ratio (SINR), and soft information after MIMO equalization. An example is used in which a feedback is based on an intermediate result of channel estimation. After completing channel estimation based on a downlink data demodulation reference signal, a user may compute a signal to interference plus noise ratio (SINR) of the downlink data demodulation reference signal, and then compares the SINR with a modulation and coding scheme used for current data transmission of the user, and in turn, estimate a probability of correct reception of user data. If this probability is higher than a threshold, the user feeds back an ACK, and if the probability is lower than or equal to the threshold, the user feeds back a NACK. Because the foregoing rough estimation is not based on a final result of data demodulation and decoding, a processing capability required from user equipment can be correspondingly lower. In this way, a possibility of quick obtainment of an estimation result and quick feedback to the base station is greatly increased. In addition, because of the timely feedback, a processing latency left for the base station is also increased correspondingly.

Basic steps of the foregoing rough feedback-based transmission mode are as follows. The terminal device generates a rough feedback based on control information and a part of data that are received in a downlink, and quickly sends the feedback to the network device, in turn, the network device can determine, based on the rough feedback, whether to perform data retransmission in a next scheduling period, and the terminal device continues to receive data and perform demodulation and decoding, and provides a feedback about a final result of data reception.

However, for a time division duplex (TDD) system, a network device starts control channel listening at the beginning of each scheduling period, and receives a data part in a following part of the period. Even if user equipment is able to obtain a rough feedback result quickly, the user equipment still needs to wait for an uplink occasion, for example, the end part of each frame, to send the result to the base station. Therefore, the user equipment is unable to send the rough feedback result to the base station quickly.

Figure 2:
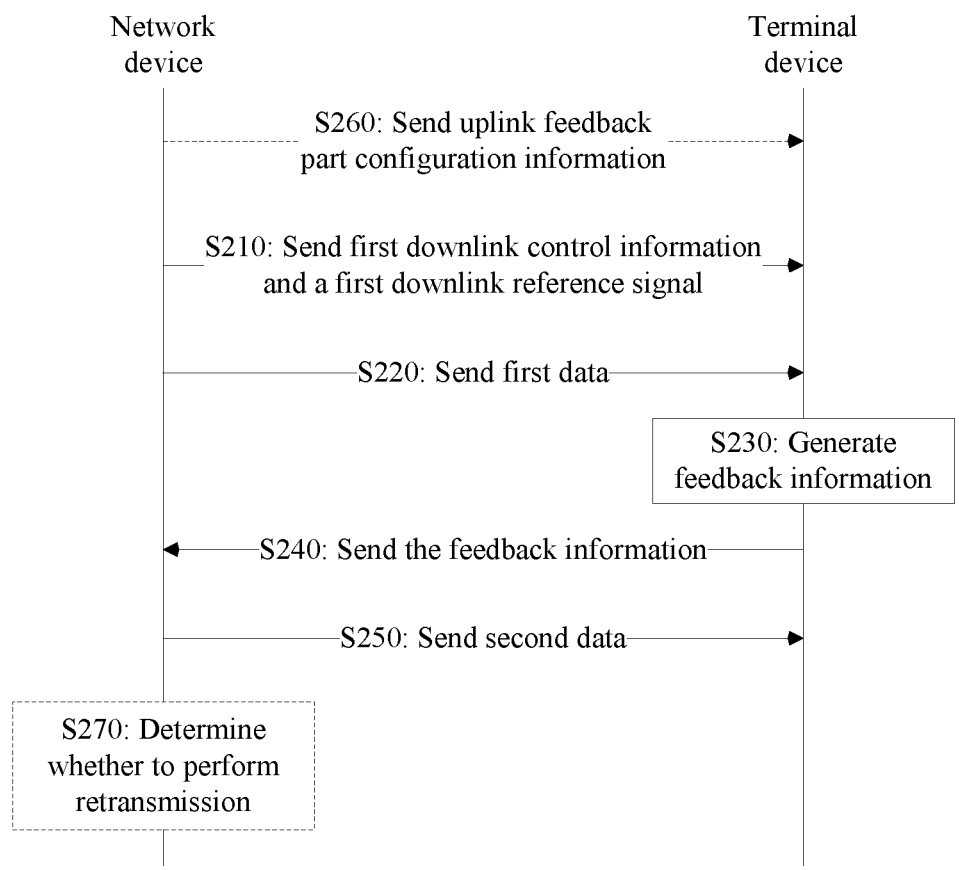
FIG. 2 is a flowchart of an embodiment of a data transmission method in a time division duplex system according to this application.

Referring to FIG. 2, an embodiment of a data transmission method in a time division duplex system provided in this application includes S210, S220, S230, S240, and S250.

S210: A network device sends first downlink control information and a first downlink reference signal to a terminal device in a downlink control part.

For example, the first downlink control information includes at least scheduling information for downlink data transmission. Specifically, the first downlink control information may include time-frequency resource allocation, a modulation and coding scheme, and a data transmission mode of downlink data.

For example, the first downlink reference signal is at least used for channel estimation by the terminal device. A result of the channel estimation may be used to demodulate the first downlink control information and/or a downlink data channel indicated by the first downlink control information.

S220: The network device sends first data to the terminal device in a first downlink data part according to the first downlink control information.

For example, the first downlink control information includes at least scheduling information for the first data.

S230: The terminal device generates feedback information based on the first downlink reference signal and the first data.

For example, the terminal device estimates, based on the first downlink reference signal and the first data, a probability of correct data reception. If the probability is higher than a threshold (or if the probability is higher than or equal to a threshold), the feedback information is an ACK, and if the probability is lower than the threshold, the feedback information is a NACK.

S240: The terminal device sends the feedback information to the network device in an uplink feedback part.

S250: The network device sends second data to the terminal device in a second downlink data part according to the first downlink control information.

For example, the first downlink control information includes at least scheduling information for the second data.

In this embodiment, the downlink control part, the first downlink data part, the uplink feedback part, and the second downlink data part constitute a first time unit, and in terms of timing, the first time unit sequentially includes the downlink control part, the first downlink data part, the uplink feedback part, and the second downlink data part.

Figure 3:
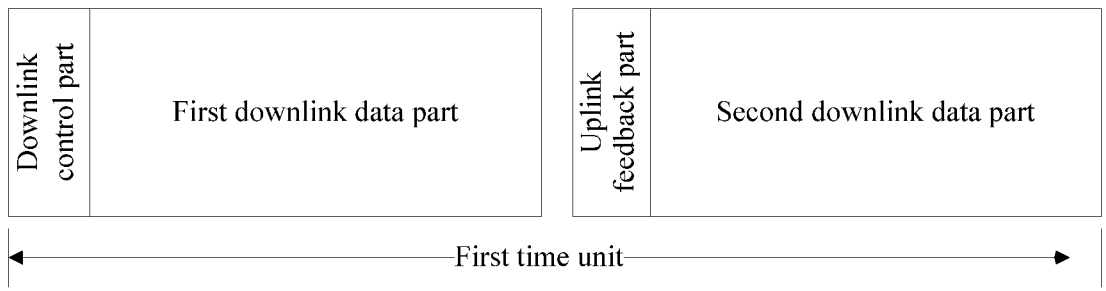
FIG. 3 is a schematic diagram of an embodiment of a TDD frame structure according to this application.

As shown in FIG. 3, the downlink control part is located at the beginning of the first time unit, the first downlink data part follows the downlink control part, the uplink feedback part follows the first downlink data part, a guard gap (GAP) is present between the first downlink data part and the uplink feedback part, and the second downlink data part is located at the end of the first time unit.

For example, the first time unit and another one or more time units constitute one radio frame. The another one or more time units may have or not have a same structure as the first time unit, or some of the time units have a same structure as the first time unit while others do not. This is not limited in this embodiment.

Herein, the first time unit may also be referred to as a scheduling period and it may be any time unit in the radio frame in terms of timing. This is not limited in this embodiment.

In this embodiment, the terminal device generates the feedback information based on the first downlink reference signal and the first data that are received, and sends the feedback information to the network device before receiving the second data. Therefore, the network device can choose, based on the feedback information, whether to retransmit the first data and the second data. This ensures soonest data retransmission and thereby reduces a transmission latency. In addition, with this method, a processing capability required from the terminal device can be correspondingly lower, and because of the timely feedback, a processing latency left for the network device is also increased correspondingly.

Optionally, the first data is different from the second data.

For example, the first data and the second data include different primitive bit information. In other words, the second data is not a repetition of the first data.

For example, the first data may be a transport block 1, and the second data may be a transport block 2, or the first data may be a transport block 1 and a part of a transport block 2, and the second data may be the rest of the transport block 2 (or the rest of the transport block 2 and a transport block 3), or the first data may be a part of a transport block 1, and the second data may be the rest of the transport block 1 and a part of a transport block 2.

Optionally, the first data and the second data constitute a first transport block (TB).

For example, the first transport block is a transport block resulting from code block segmentation, code block parity bit addition, channel code interleaving, code block concatenation, and parity bit addition on a first primitive information bit block.

For example, the network device divides the first transport block into two parts. A first part is transmitted as the first data, and a second part is transmitted as the second data.

Optionally, the first time unit includes one subframe.

For example, the subframe may be a slot, a mini-slot, or a self-contained subframe.

Optionally, this embodiment further includes S260.

S260: The network device sends uplink feedback part configuration information to the terminal device, where the uplink feedback part configuration information indicates a time-frequency resource location of the uplink feedback part.

Optionally, the first time unit includes M OFDM symbols, where M is a positive integer, and the uplink feedback part includes the $N^{th}$ OFDM symbol in the first time unit, where when N is an even number, N=M/2 or N=M/2+1, and when N is an odd number, N=(M+1)/2.

In other words, for example, the uplink feedback part is located in the middle of the first time unit. For example, when the first time unit includes 14 OFDM symbols, the uplink feedback part may include the sixth, the seventh, or the eighth OFDM symbol in the first time unit. For another example, when the first time unit includes seven OFDM symbols, the uplink feedback part may include the third or the fourth OFDM symbol of the following OFDM symbols in the first time unit.

For example, the location of the uplink feedback part in the first time unit may be adjusted as required. For example, if more processing time needs to be left for the terminal device, the location of the uplink feedback part may be moved forward (meaning that a quantity of OFDM symbols before the uplink feedback part of the first time unit is increased, and a quantity of OFDM symbols after the uplink feedback part is decreased). If the network device is required to receive a feedback sooner, the location of the uplink feedback part may be moved backward (meaning that a quantity of OFDM symbols before the uplink feedback part of the first time unit is decreased, and a quantity of OFDM symbols after the uplink feedback part is increased).

Optionally, this embodiment further includes S270.

S270: The network device determines, based on the feedback information, whether to retransmit the first data and the second data in a time unit following the first time unit.

For example, if the feedback information is an ACK, the network device determines not to retransmit the first data and the second data in the time unit following the first time unit. If the feedback information is a NACK, the network device determines to retransmit the first data and the second data in the time unit following the first time unit.

Corresponding to the foregoing method, this application provides embodiments of a terminal device and a network device. The terminal device and the network device can perform respective steps in the foregoing method embodiment.

Figure 4:
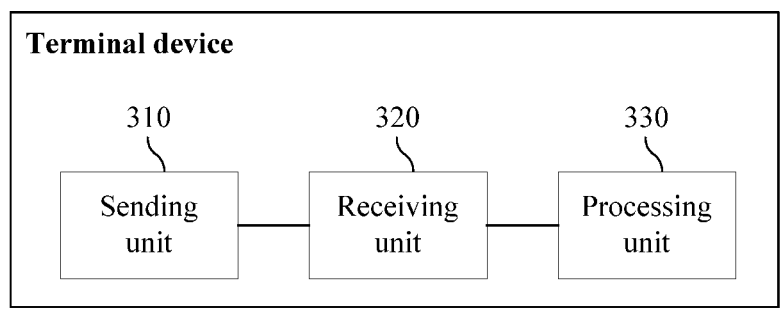
FIG. 4 is a structural diagram of an embodiment of a terminal device according to this application.

Referring to FIG. 4, an embodiment of a terminal device provided in this application includes a sending unit 310, a receiving unit 320, and a processing unit 330.

The receiving unit 320 is configured to receive, in a downlink control part, first downlink control information and a first downlink reference signal that are sent by a network device.

The receiving unit 320 is further configured to receive, in a first downlink data part according to the first downlink control information, first data sent by the network device.

The processing unit 330 is configured to generate feedback information based on the first downlink reference signal and the first data.

The sending unit 310 is configured to send the feedback information to the network device in an uplink feedback part.

The receiving unit 320 is further configured to receive, in a second downlink data part according to the first downlink control information, second data sent by the network device.

In this embodiment, the downlink control part, the first downlink data part, the uplink feedback part, and the second downlink data part constitute a first time unit, and in terms of timing, the first time unit sequentially includes the downlink control part, the first downlink data part, the uplink feedback part, and the second downlink data part.

Optionally, the first data is different from the second data.

Optionally, the first data and the second data constitute a first transport block.

Optionally, the first time unit includes one subframe.

Optionally, the receiving unit 320 is further configured to receive uplink feedback part configuration information from the network device, where the uplink feedback part configuration information indicates a time-frequency resource location of the uplink feedback part.

Optionally, the first time unit includes M OFDM symbols, where M is a positive integer, and the uplink feedback part includes the $N^{th}$ OFDM symbol in the first time unit, where when N is an even number, $N=M/2$ or $N=M/2+1$, and when N is an odd number, $N=(M+1)/2$.

For technical details in this embodiment and a detailed description about beneficial effects, refer to the foregoing method embodiment.

Figure 5:
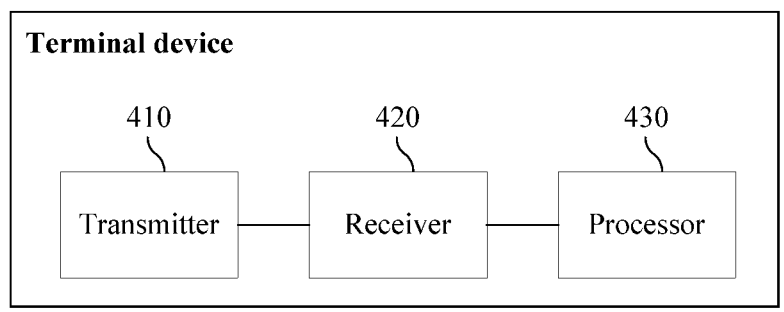
FIG. 5 is a structural diagram of another embodiment of a terminal device according to this application.

Referring to FIG. 5, another embodiment of a terminal device provided in this application includes a transmitter 410, a receiver 420, and a processor 430.

The receiver 420 is configured to receive, in a downlink control part, first downlink control information and a first downlink reference signal that are sent by a network device.

The receiver 420 is further configured to receive, in a first downlink data part according to the first downlink control information, first data sent by the network device.

The processor 430 is configured to generate feedback information based on the first downlink reference signal and the first data.

The transceiver 410 is configured to send the feedback information to the network device in an uplink feedback part.

The receiver 420 is further configured to receive, in a second downlink data part according to the first downlink control information, second data sent by the network device.

In this embodiment, the downlink control part, the first downlink data part, the uplink feedback part, and the second downlink data part constitute a first time unit, and in terms of timing, the first time unit sequentially includes the downlink control part, the first downlink data part, the uplink feedback part, and the second downlink data part.

Optionally, the first data is different from the second data.

Optionally, the first data and the second data constitute a first transport block.

Optionally, the first time unit includes one subframe.

Optionally, the receiver 420 is further configured to receive uplink feedback part configuration information from the network device, where the uplink feedback part configuration information indicates a time-frequency resource location of the uplink feedback part.

Optionally, the first time unit includes M OFDM symbols, where M is a positive integer, and the uplink feedback part includes the $N^{th}$ OFDM symbol in the first time unit, where when N is an even number, $N=M/2$ or $N=M/2+1$, and when N is an odd number, $N=(M+1)/2$.

For technical details in this embodiment and a detailed description about beneficial effects, refer to the foregoing method embodiment.

Figure 6:
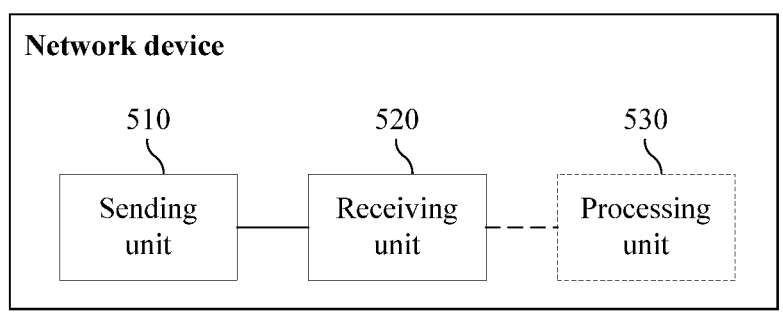
FIG. 6 is a structural diagram of an embodiment of a network device according to this application.

Referring to FIG. 6, an embodiment of a network device provided in this application includes a sending unit 510 and a receiving unit 520.

The sending unit 510 is configured to send first downlink control information and a first downlink reference signal to a terminal device in a downlink control part.

The sending unit 510 is further configured to send first data to the terminal device in a first downlink data part according to the first downlink control information.

The receiving unit 520 is configured to receive, in an uplink feedback part, feedback information sent by the terminal device.

The sending unit 510 is further configured to send second data to the terminal device in a second downlink data part according to the first downlink control information.

In this embodiment, the downlink control part, the first downlink data part, the uplink feedback part, and the second downlink data part constitute a first time unit, and in terms of timing, the first time unit sequentially includes the downlink control part, the first downlink data part, the uplink feedback part, and the second downlink data part.

Optionally, the first data is different from the second data.

Optionally, the first data and the second data constitute a first transport block.

Optionally, the first time unit includes one subframe.

Optionally, the sending unit 510 is further configured to send uplink feedback part configuration information to the terminal device, where the uplink feedback part configuration information indicates a time-frequency resource location of the uplink feedback part.

Optionally, the first time unit includes M OFDM symbols, where M is a positive integer, and the uplink feedback part includes the $N^{th}$ OFDM symbol in the first time unit, where when N is an even number, $N=M/2$ or $N=M/2+1$, and when N is an odd number, $N=(M+1)/2$.

Optionally, this embodiment further includes a processing unit 530.

The processing unit 530 is configured to determine, based on the feedback information, whether to retransmit the first data and the second data in a time unit following the first time unit.

For technical details in this embodiment and a detailed description about beneficial effects, refer to the foregoing method embodiment.

Figure 7:
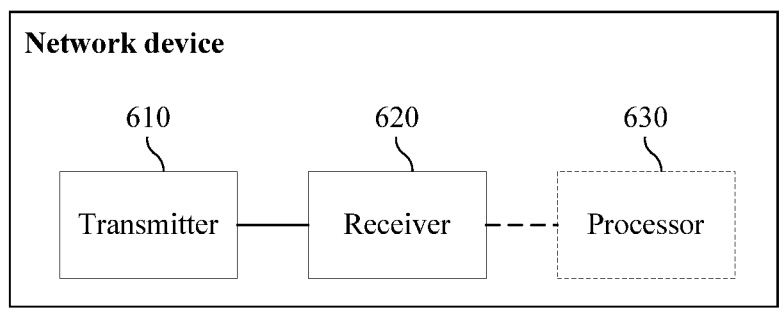
FIG. 7 is a structural diagram of another embodiment of a network device according to this application.

Referring to FIG. 7, another embodiment of a network device provided in this application includes a transmitter 610 and a receiver 620.

The transmitter 610 is configured to send first downlink control information and a first downlink reference signal to a terminal device in a downlink control part.

The transmitter 610 is further configured to send first data to the terminal device in a first downlink data part according to the first downlink control information.

The receiver 620 is configured to receive, in an uplink feedback part, feedback information sent by the terminal device.

The transmitter 610 is further configured to send second data to the terminal device in a second downlink data part according to the first downlink control information.

In this embodiment, the downlink control part, the first downlink data part, the uplink feedback part, and the second downlink data part constitute a first time unit, and in terms of timing, the first time unit sequentially includes the downlink control part, the first downlink data part, the uplink feedback part, and the second downlink data part.

Optionally, the first data is different from the second data.

Optionally, the first data and the second data constitute a first transport block.

Optionally, the first time unit includes one subframe.

Optionally, the transmitter 610 is further configured to send uplink feedback part configuration information to the terminal device, where the uplink feedback part configuration information indicates a time-frequency resource location of the uplink feedback part.

Optionally, the first time unit includes M OFDM symbols, where M is a positive integer, and the uplink feedback part includes the $N^{th}$ OFDM symbol in the first time unit, where when N is an even number, N=M/2 or N=M/2+1, and when N is an odd number, N=(M+1)/2.

Optionally, this embodiment further includes a processor 630.

The processor 630 is configured to determine, based on the feedback information, whether to retransmit the first data and the second data in a time unit following the first time unit.

For technical details in this embodiment and a detailed description about beneficial effects, refer to the foregoing method embodiment.

Figure 8:
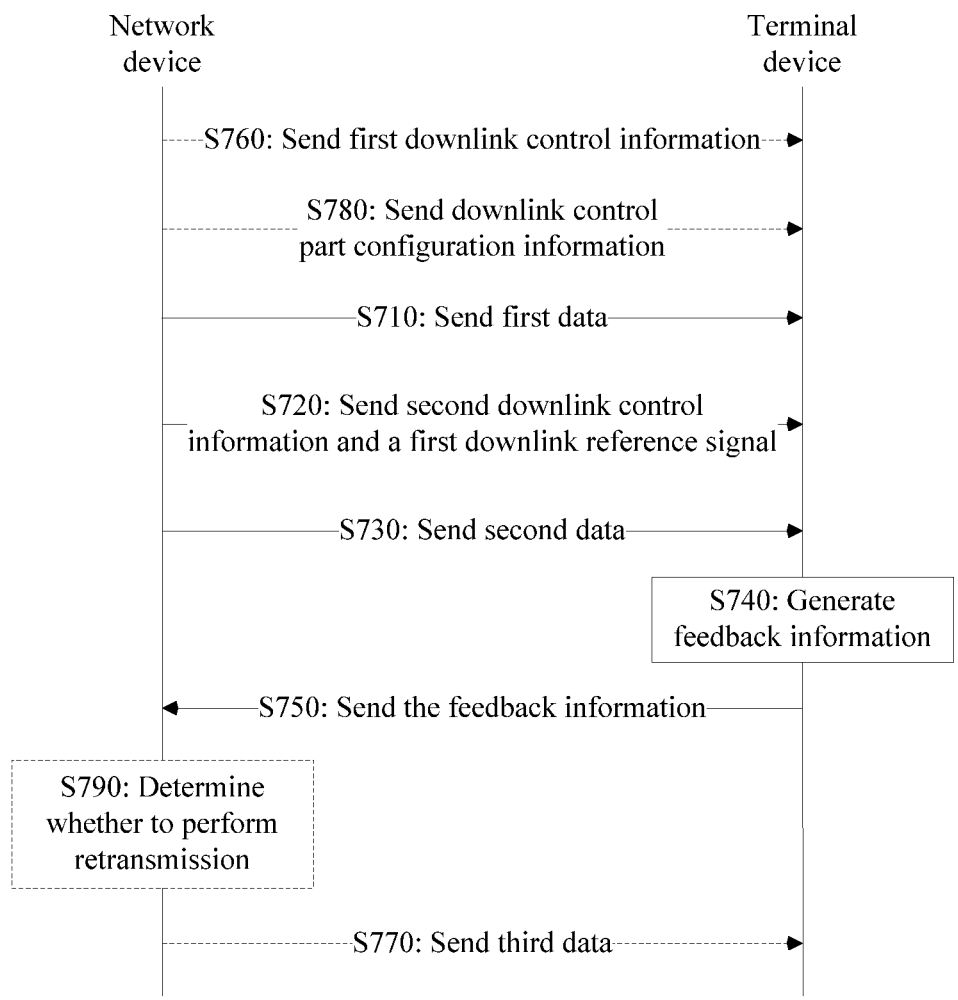
FIG. 8 is a flowchart of another embodiment of a data transmission method in a time division duplex system according to this application.

Referring to FIG. 8, another embodiment of a data transmission method in a time division duplex system provided in this application includes S710, S720, S730, S740, and S750.

S710: A network device sends first data to a terminal device in a first downlink data part according to first downlink control information.

For example, the first downlink control information includes at least scheduling information for downlink data transmission. Specifically, the first downlink control information may include time-frequency resource allocation, a modulation and coding scheme, and a data transmission mode of downlink data.

For example, the first downlink control information includes at least scheduling information for the first data.

S720: The network device sends second downlink control information and a first downlink reference signal to the terminal device in a downlink control part.

For example, the second downlink control information includes at least scheduling information for downlink data transmission. Specifically, the first downlink control information may include time-frequency resource allocation, a modulation and coding scheme, and a data transmission mode of downlink data.

For example, the first downlink reference signal is at least used for channel estimation by the terminal device. A result of the channel estimation may be used to demodulate the first downlink control information and/or a downlink data channel indicated by the first downlink control information.

S730: The network device sends second data to the terminal device in a second downlink data part according to the second downlink control information.

For example, the second downlink control information includes at least scheduling information for the second data.

S740: The terminal device generates feedback information based on the first downlink reference signal and the second data.

For example, the terminal device estimates, based on the first downlink reference signal and the first data, a probability of correct data reception. If the probability is higher than a threshold (or if the probability is higher than or equal to a threshold), the feedback information is an ACK, and if the probability is lower than the threshold, the feedback information is a NACK.

S750: The terminal device sends the feedback information to the network device in an uplink feedback part.

In this embodiment, the first downlink data part, the downlink control part, the second downlink data part, and the uplink feedback part constitute a first time unit, and in terms of timing, the first time unit sequentially includes the first downlink data part, the downlink control part, the second downlink data part, and the uplink feedback part.

Figure 9:
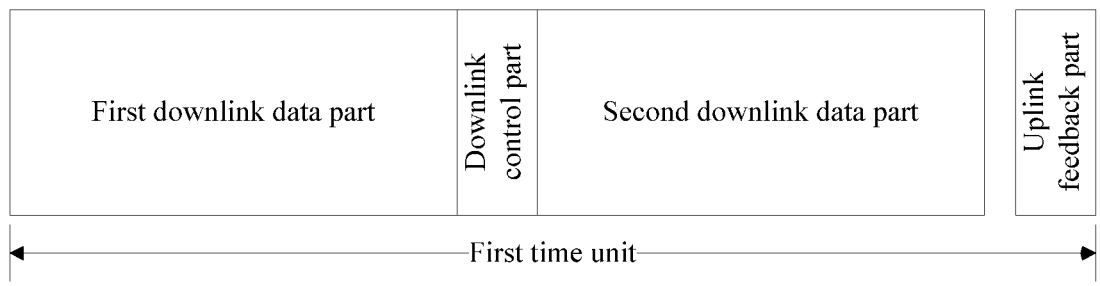
FIG. 9 is a schematic diagram of another embodiment of a TDD frame structure according to this application.

As shown in FIG. 9, the first downlink data part is located at the beginning of the first time unit, the downlink control part follows the first downlink data part, the second downlink data part follows the downlink control part, the uplink feedback part is located at the end of the first time unit, and a guard gap exists between the uplink feedback part and the second downlink data part.

For example, the first time unit and another one or more time units constitute one radio frame. The another one or more time units may have or not have a same structure as the first time unit, or some of the time units have a same structure as the first time unit while others do not. This is not limited in this embodiment.

Herein, the first time unit may also be referred to as a scheduling period and it may be any time unit in the radio frame in terms of timing. This is not limited in this embodiment.

In this embodiment, the terminal device generates the feedback information based on the first downlink reference signal and the second data that are received, and sends the feedback information to the network device in the current time unit. Therefore, the network device can choose, based on the feedback information, whether to retransmit the second data. This ensures soonest data retransmission and thereby reduces a transmission latency. In addition, with this method, a processing capability required from the terminal device can be correspondingly lower, and because of the timely feedback, a processing latency left for the network device is also increased correspondingly.

Optionally, this embodiment further includes S760.

S760: The network device sends, in a downlink control part of a time unit preceding the first time unit, the first downlink control information to the terminal device.

Optionally, this embodiment further includes S770.

S770: The network device sends third data to the terminal device in a first downlink data part of a time unit following the first time unit according to the second downlink control information.

Optionally, the second data is different from the third data.

For example, the second data and the third data include different primitive bit information. In other words, the third data is not a repetition of the second data.

For example, the second data may be a transport block 1, and the third data may be a transport block 2, or the second data may be a transport block 1 and a part of a transport block 2, and the third data may be the rest of the transport block 2 (or the rest of the transport block 2 and a transport block 3), or the second data may be a part of a transport block 1, and the third data may be the rest of the transport block 1 and a part of a transport block 2.

Optionally, the second data and the third data constitute a first transport block.

For example, the first transport block is a transport block resulting from code block segmentation, code block parity bit addition, channel code interleaving, code block concatenation, and parity bit addition on a first primitive information bit block.

For example, the network device divides the first transport block into two parts. A first part is transmitted as the second data, and a second part is transmitted as the third data.

Optionally, the first time unit includes one subframe.

For example, the subframe may be a slot, a mini-slot, or a self-contained subframe.

Optionally, this embodiment further includes S780.

S780: The network device sends downlink control part configuration information to the terminal device, where the downlink control part configuration information indicates a time-frequency resource location of the downlink control part.

Optionally, the first time unit includes M OFDM symbols, where M is a positive integer, and the downlink control part includes the $N^{th}$ OFDM symbol in the first time unit, where when N is an even number, N=M/2 or N=M/2+1, and when N is an odd number, N=(M+1)/2.

In other words, for example, the downlink control part is located in the middle of the first time unit. For example, when the first time unit includes 14 OFDM symbols, the downlink control part may include the sixth, the seventh, or the eighth OFDM symbol in the first time unit. For another example, when the first time unit includes seven OFDM symbols, the downlink control part may include the third or the fourth OFDM symbol of the following OFDM symbols in the first time unit.

For example, the location of the downlink control part in the first time unit may be adjusted as required. For example, if more processing time needs to be left for the terminal device, the location of the downlink control part may be moved forward (meaning that a quantity of OFDM symbols before the downlink control part of the first time unit is increased, and a quantity of OFDM symbols after the downlink control part is decreased). If the network device is required to receive a feedback sooner, the location of the downlink control part may be moved backward (meaning that a quantity of OFDM symbols before the downlink control part of the first time unit is decreased, and a quantity of OFDM symbols after the downlink control part is increased).

Optionally, this embodiment further includes S790.

S790: The network device determines, based on the feedback information, whether to retransmit the second data and the third data.

For example, if the feedback information is an ACK, the network device determines not to retransmit the second data and the third data. If the feedback information is a NACK, the network device determines to retransmit the second data and the third data.

Herein, S760 and S780 are not limited to the order shown in FIG. 8, and may be performed in a reverse order or simultaneously. S770 and S790 are also not limited to the order shown in FIG. 8, and may be performed in a reverse order or simultaneously.

Corresponding to the foregoing method, this application provides embodiments of a terminal device and a network device. The terminal device and the network device can perform respective steps in the foregoing method embodiment.

Figure 10:
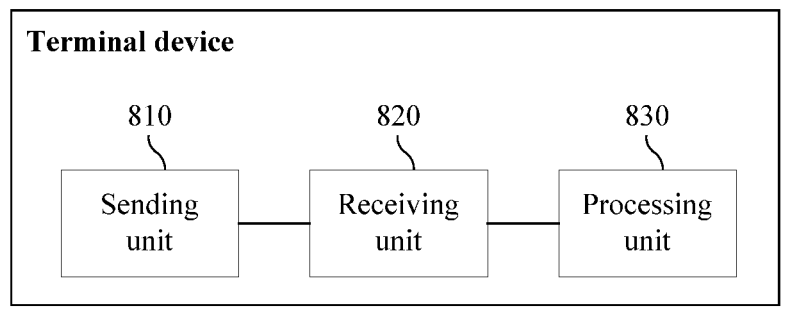
FIG. 10 is a structural diagram of still another embodiment of a terminal device according to this application.

Referring to FIG. 10, still another embodiment of a terminal device provided in this application includes a sending unit 810, a receiving unit 820, and a processing unit 830.

The receiving unit 820 is configured to receive, in a first downlink data part according to first downlink control information, first data sent by the network device.

The receiving unit 820 is further configured to receive, in a downlink control part, second downlink control information and a first downlink reference signal that are sent by the network device.

The receiving unit 820 is further configured to receive, in a second downlink data part according to the second downlink control information, second data sent by the network device.

The processing unit 830 is configured to generate feedback information based on the first downlink reference signal and the second data.

The sending unit 810 is configured to send the feedback information to the network device in an uplink feedback part.

In this embodiment, the first downlink data part, the downlink control part, the second downlink data part, and the uplink feedback part constitute a first time unit, and in terms of timing, the first time unit sequentially includes the first downlink data part, the downlink control part, the second downlink data part, and the uplink feedback part.

Optionally, the receiving unit 820 is further configured to receive, in a downlink control part of a time unit preceding the first time unit, the first downlink control information sent by the network device.

Optionally, the receiving unit 820 is further configured to receive, in a first downlink data part of a time unit following the first time unit according to the second downlink control information, third data sent by the network device.

Optionally, the second data is different from the third data.

Optionally, the second data and the third data constitute a first transport block.

Optionally, the first time unit includes one subframe.

Optionally, the receiving unit 820 is further configured to receive downlink control part configuration information from the network device, where the downlink control part configuration information indicates a time-frequency resource location of the downlink control part.

Optionally, the first time unit includes M OFDM symbols, where M is a positive integer, and the downlink control part includes the $N^{th}$ OFDM symbol in the first time unit, where when N is an even number, N=M/2 or N=M/2+1, and when N is an odd number, N=(M+1)/2.

For technical details in this embodiment and a detailed description about beneficial effects, refer to the foregoing method embodiment.

Figure 11:
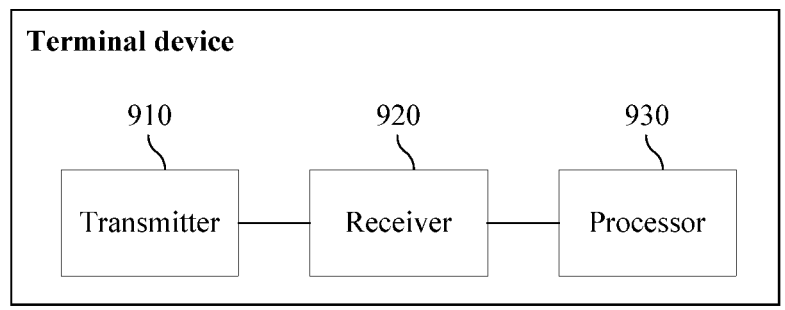
FIG. 11 is a structural diagram of yet another embodiment of a terminal device according to this application.

Referring to FIG. 11, yet another embodiment of a terminal device provided in this application includes a transmitter 910, a receiver 920, and a processor 930.

The receiving unit 920 is configured to receive, in a first downlink data part according to first downlink control information, first data sent by the network device.

The receiving unit 920 is further configured to receive, in a downlink control part, second downlink control information and a first downlink reference signal that are sent by the network device.

The receiving unit 920 is further configured to receive, in a second downlink data part according to the second downlink control information, second data sent by the network device.

The processing unit 930 is configured to generate feedback information based on the first downlink reference signal and the second data.

The sending unit 910 is configured to send the feedback information to the network device in an uplink feedback part.

In this embodiment, the first downlink data part, the downlink control part, the second downlink data part, and the uplink feedback part constitute a first time unit, and in terms of timing, the first time unit sequentially includes the first downlink data part, the downlink control part, the second downlink data part, and the uplink feedback part.

Optionally, the receiving unit 920 is further configured to receive, in a downlink control part of a time unit preceding the first time unit, the first downlink control information sent by the network device.

Optionally, the receiving unit 920 is further configured to receive, in a first downlink data part of a time unit following the first time unit according to the second downlink control information, third data sent by the network device.

Optionally, the second data is different from the third data.

Optionally, the second data and the third data constitute a first transport block.

Optionally, the first time unit includes one subframe.

Optionally, the receiver 920 is further configured to receive downlink control part configuration information from the network device, where the downlink control part configuration information indicates a time-frequency resource location of the downlink control part.

Optionally, the first time unit includes M OFDM symbols, where M is a positive integer, and the downlink control part includes the $N^{th}$ OFDM symbol in the first time unit, where when N is an even number, N=M/2 or N=M/2+1, and when N is an odd number, N=(M+1)/2.

For technical details in this embodiment and a detailed description about beneficial effects, refer to the foregoing method embodiment.

Figure 12:
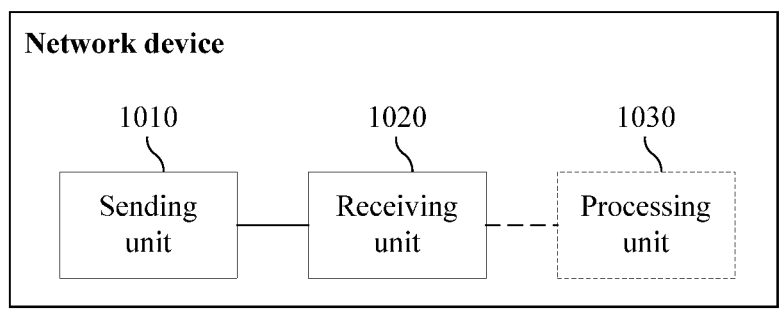
FIG. 12 is a structural diagram of still another embodiment of a network device according to this application.

Referring to FIG. 12, still another embodiment of a network device provided in this application includes a sending unit 1010 and a receiving unit 1020.

The sending unit 1010 is configured to send first data to a terminal device in a first downlink data part according to first downlink control information.

The sending unit 1010 is further configured to send second downlink control information and a first downlink reference signal to the terminal device in a downlink control part.

The sending unit 1010 is further configured to send second data to the terminal device in a second downlink data part according to the second downlink control information.

The receiving unit 1020 is configured to receive, in an uplink feedback part, feedback information sent by the terminal device.

In this embodiment, the first downlink data part, the downlink control part, the second downlink data part, and the uplink feedback part constitute a first time unit, and in terms of timing, the first time unit sequentially includes the first downlink data part, the downlink control part, the second downlink data part, and the uplink feedback part.

Optionally, the sending unit 1010 is further configured to send the first downlink control information to the terminal device in a downlink control part of a time unit preceding the first time unit.

Optionally, the sending unit 1010 is further configured to send third data to the terminal device in a first downlink data part of a time unit following the first time unit according to the second downlink control information.

Optionally, the second data is different from the third data.

Optionally, the second data and the third data constitute a first transport block.

Optionally, the first time unit includes one subframe.

Optionally, the sending unit 1010 is further configured to send downlink control part configuration information to the terminal device, where the downlink control part configuration information indicates a time-frequency resource location of the downlink control part.

Optionally, the first time unit includes M OFDM symbols, where M is a positive integer, and the downlink control part includes the $N^{th}$ OFDM symbol in the first time unit, where when N is an even number, N=M/2 or N=M/2+1, and when N is an odd number, N=(M+1)/2.

Optionally, this embodiment further includes a processing unit 1030.

The processing unit 1030 is configured to determine, based on the feedback information, whether to retransmit the second data and the third data.

For technical details in this embodiment and a detailed description about beneficial effects, refer to the foregoing method embodiment.

Figure 13:
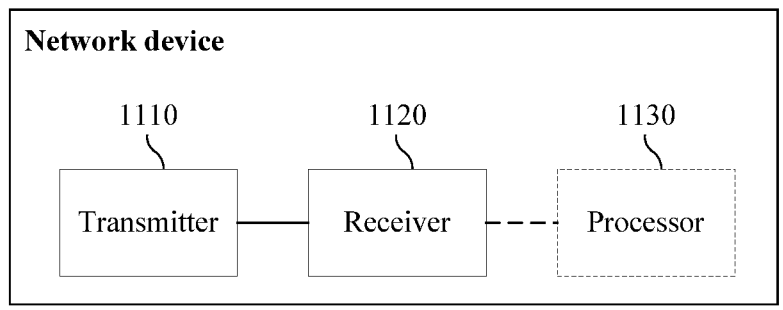
FIG. 13 is a structural diagram of yet another embodiment of a network device according to this application.

Referring to FIG. 13, still another embodiment of a network device provided in this application includes a transmitter 1110 and a receiver 1120.

The transmitter 1110 is configured to send first data to a terminal device in a first downlink data part according to first downlink control information.

The transmitter 1110 is further configured to send second downlink control information and a first downlink reference signal to the terminal device in a downlink control part.

The transmitter 1110 is further configured to send second data to the terminal device in a second downlink data part according to the second downlink control information.

The receiver 1120 is configured to receive, in an uplink feedback part, feedback information sent by the terminal device.

In this embodiment, the first downlink data part, the downlink control part, the second downlink data part, and the uplink feedback part constitute a first time unit, and in terms of timing, the first time unit sequentially includes the first downlink data part, the downlink control part, the second downlink data part, and the uplink feedback part.

Optionally, the transmitter 1110 is further configured to send the first downlink control information to the network device in a downlink control part of a time unit preceding the first time unit.

Optionally, the transmitter 1110 is further configured to send third data to the network device in a first downlink data part of a time unit following the first time unit according to the second downlink control information.

Optionally, the second data is different from the third data.

Optionally, the second data and the third data constitute a first transport block.

Optionally, the first time unit includes one subframe.

Optionally, the transmitter 1130 is further configured to send downlink control part configuration information to the terminal device, where the downlink control part configuration information indicates a time-frequency resource location of the downlink control part.

Optionally, the first time unit includes M OFDM symbols, where M is a positive integer, and the downlink control part includes the $N^{th}$ OFDM symbol in the first time unit, where when N is an even number, N=M/2 or N=M/2+1, and when N is an odd number, N=(M+1)/2.

Optionally, this embodiment further includes a processor 1130.

The processor 1130 is configured to determine, based on the feedback information, whether to retransmit the second data and the third data.

For technical details in this embodiment and a detailed description about beneficial effects, refer to the foregoing method embodiment.

A person of ordinary skill in the art can understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely specific examples of this application, but are not intended to limit this application. Any modification, equivalent replacement, or improvement made without departing from the spirit and principle of this application should fall within the protection scope of this application.

What is claimed is:

1. A data transmission method in a time division duplex system, comprising:
    receiving, by a terminal device in a downlink control part, first downlink control information and a first downlink reference signal that are sent by a network device;
    receiving, by the terminal device, in a first downlink data part, according to the first downlink control information, first data sent by the network device;
    generating, by the terminal device, feedback information according to the first downlink reference signal and the first data;
    sending, by the terminal device, in an uplink feedback part, the feedback information to the network device; and
    receiving, by the terminal device in a second downlink data part, according to the first downlink control information, second data sent by the network device, wherein the first downlink control information is sent by the network device before the terminal device sends the feedback information, and wherein the second data is sent by the network device after the terminal device sends the feedback information;
    wherein the downlink control part, the first downlink data part, the uplink feedback part, and the second downlink data part constitute a first time unit; and
    wherein, in terms of timing, the first time unit sequentially comprises the downlink control part, the first downlink data part, the uplink feedback part, and the second downlink data part.

2. The method according to claim 1, wherein the first data is different from the second data.

3. The method according to claim 1, wherein the first data and the second data constitute a first transport block.

4. The method according to claim 1, wherein the first time unit comprises one subframe.

5. The method according to claim 1, wherein the method further comprises:
    receiving, by the terminal device, uplink feedback part configuration information from the network device, wherein the uplink feedback part configuration information indicates a time-frequency resource location of the uplink feedback part.

6. The method according to claim 1, wherein the first time unit comprises M OFDM symbols, wherein M is a positive integer; and
    wherein the uplink feedback part comprises an $N^{th}$ OFDM symbol in the first time unit, wherein, when N is an even number, N is determined according to at least one of N=M/2 or N=M/2+1, and wherein, when N is an odd number, N=(M+1)/2.

7. The method according to claim 1, wherein the sending the feedback information to the network device is performed before the receiving the second data sent by the network device.

8. An apparatus in a time division duplex system, comprising:
    a processor; and
    a non-transitory computer-readable storage medium storing a program to be executed by the processor, the program including instructions to:
    receive, in a downlink control part, first downlink control information and a first downlink reference signal that are sent by a network device;
    receive, in a first downlink data part, according to the first downlink control information, first data sent by the network device;
    generate feedback information according to the first downlink reference signal and the first data;
    send the feedback information to the network device in an uplink feedback part; and
    receive, in a second downlink data part, according to the first downlink control information, second data sent by the network device, wherein the first downlink control information is sent by the network device before the apparatus sends the feedback information, and wherein the second data is sent by the network device after the apparatus sends the feedback information;
    wherein the downlink control part, the first downlink data part, the uplink feedback part, and the second downlink data part constitute a first time unit; and
    wherein, in terms of timing, the first time unit sequentially comprises the downlink control part, the first downlink data part, the uplink feedback part, and the second downlink data part.

9. The apparatus according to claim 8, wherein the first data is different from the second data.

10. The apparatus according to claim 8, wherein the first data and the second data constitute a first transport block.

11. The apparatus according to claim 8, wherein the first time unit comprises one subframe.

12. The apparatus according to claim 8, wherein the program further includes instructions to:
    receive uplink feedback part configuration information from the network device, wherein the uplink feedback part configuration information indicates a time-frequency resource location of the uplink feedback part.

13. The apparatus according to claim 8, wherein the first time unit comprises M OFDM symbols, wherein M is a positive integer; and
    wherein the uplink feedback part comprises an $N^{th}$ OFDM symbol in the first time unit, wherein, when N is an even number, N is determined according to at least one of N=M/2 or N=M/2+1, and wherein, when N is an odd number, N=(M+1)/2.

14. An apparatus in a time division duplex system, comprising:
    a processor; and a non-transitory computer-readable storage medium storing a program to be executed by the processor, the program including instructions to:
- send, in a downlink control part, first downlink control information and a first downlink reference signal to a terminal device;
- send, in a first downlink data part, according to the first downlink control information, first data to the terminal device;
- receive, in an uplink feedback part, feedback information sent by the terminal device; and
- send, in a second downlink data part, according to the first downlink control information, second data to the terminal device, wherein the first downlink control information is sent by the apparatus before the terminal device sends the feedback information, and wherein the second data is sent by the apparatus after the terminal device sends the feedback information;

wherein the downlink control part, the first downlink data part, the uplink feedback part, and the second downlink data part constitute a first time unit; and wherein, in terms of timing, the first time unit sequentially comprises the downlink control part, the first downlink data part, the uplink feedback part, and the second downlink data part.

15. The apparatus according to claim 14, wherein the first data is different from the second data.

16. The apparatus according to claim 14, wherein the first data and the second data constitute a first transport block.

17. The apparatus according to claim 14, wherein the first time unit comprises one subframe.

18. The apparatus according to claim 14, wherein the program further includes instructions to:
- send uplink feedback part configuration information to the terminal device, wherein the uplink feedback part configuration information indicates a time-frequency resource location of the uplink feedback part.

19. The apparatus according to claim 14, wherein the first time unit comprises M OFDM symbols, wherein M is a positive integer; and
- wherein the uplink feedback part comprises an $N^{th}$ OFDM symbol in the first time unit, wherein, when N is an even number, N is determined according to at least one of N=M/2 or N=M/2+1, and wherein, when N is an odd number, N=(M+1)/2.

20. The apparatus according to claim 14, wherein the program further includes instructions to:
- determine, according to the feedback information, whether to retransmit the first data and the second data in a time unit following the first time unit.

* * * * *